UNITED STATES PATENT OFFICE.

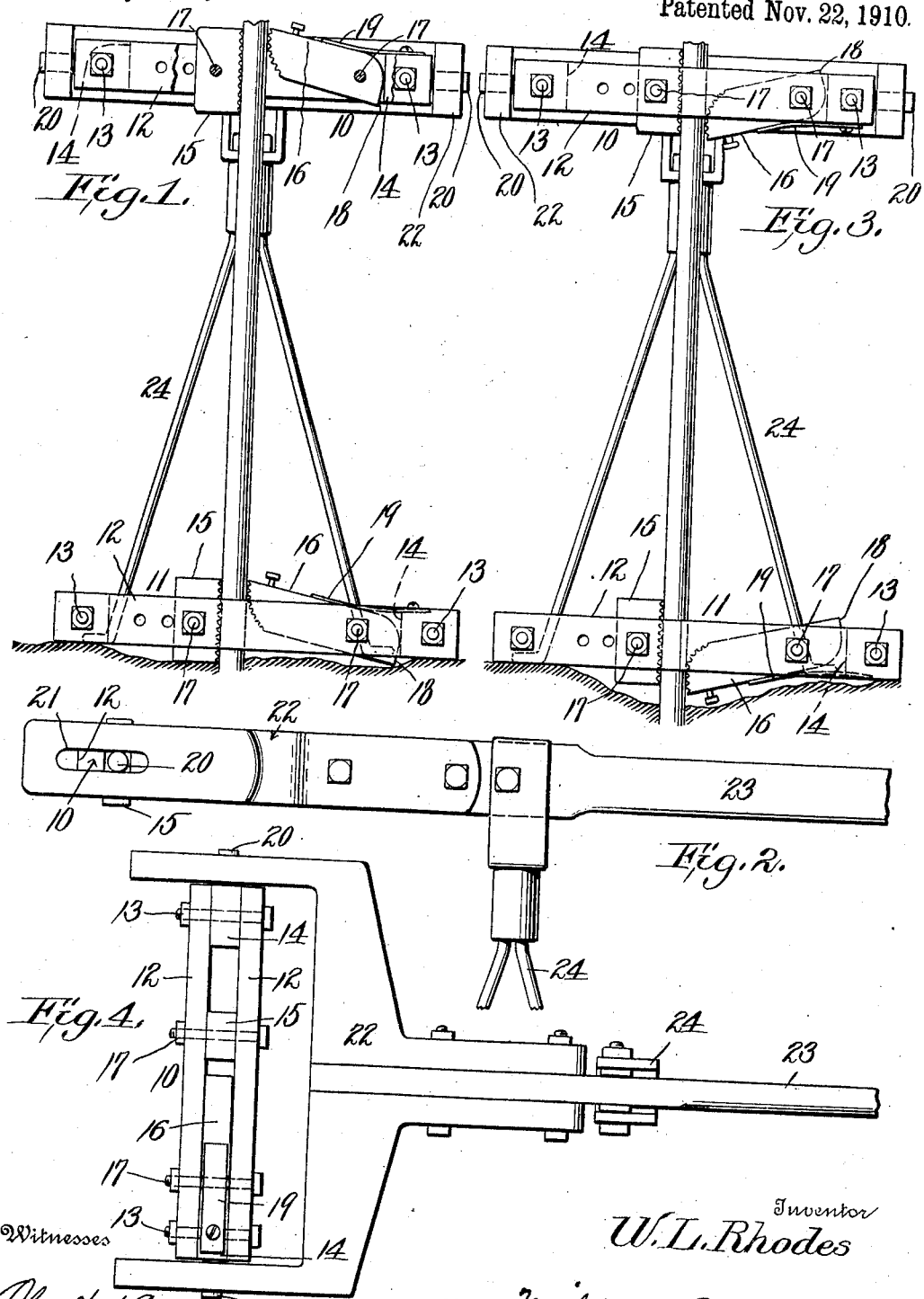

WADDILL L. RHODES, OF LONIE, TEXAS.

PUMP-PIPE INSERTOR AND REMOVER.

976,600.  Specification of Letters Patent.  Patented Nov. 22, 1910.

Application filed March 9, 1910.  Serial No. 548,234.

*To all whom it may concern:*

Be it known that I, WADDILL L. RHODES, a citizen of the United States, residing at Lonie, in the county of Childress and State of Texas, have invented certain new and useful Improvements in Pump-Pipe Insertors and Removers, of which the following is a specification.

My present invention relates to that class of pipe lifting apparatus which embodies lifting and holding frames of similar construction, the latter of which is detached, and the former of which is connected to a lever for raising and lowering the same, and my object is to provide certain novel elements of construction and arrangement which will permit of greater leverage and power of the lifting frame and also permit of its reversal whereby upon the reversal of the holding frame of the apparatus may be used to insert a pump pipe in the ground.

With this in view my invention resides in the features of construction and arrangement to be hereinafter specifically pointed out with reference to the accompanying drawing, wherein, Figure 1 is a front elevation of my improved apparatus, the lifting and holding frames being broken away to show the intermediate parts. Fig. 2 is a side elevation thereof. Fig. 3 is a view similar to Fig. 1, with the frames reversed, and Fig. 4 is a plan view of the lifting frame removed.

Referring now to these figures, the lifting and holding frames 10 and 11 are of similar construction, each embodying parallel bars 12 through the ends of which extend transverse bolts 13, these bolts extending also through members 14 interposed between the bars for the purpose of spacing them apart suitably to receive the pipe therebetween. Interposed between the bars 12 intermediate blocks or members 14, are dogs 15 and 16, upon bolts 17 through said bars, dog 15 being stationarily clamped while dog 16 is movable upon its bolt as a pivot and held from movement in one direction by the engagement of its cam-shaped outer end 18 against the adjacent spacing member 14. The inner opposing ends of these dogs 15 and 16, are serrated as shown, and this end of the movable dog 16 is also rounded. One of the bars 12 of each of the frames may also have a leaf spring 19 to bear against the movable dog 16 to tension the movement thereof in one direction.

In operation, the holding frame 11 rests upon the ground to hold a pipe when the lifting frame 10 is lowered to take a fresh grip thereon, the latter frame having its spacing member provided with outstanding rounded projections 20, extending beyond the ends of the bars 12 thereof, and forming trunnions therefor, to engage within slots 21 in the side arms of a yoke 22 at one end, and forming a part of, the operating lever 23 which is intermediately fulcrumed at the upper end of a tripod or supporting frame 24 which thus supports the lifting frame a short distance above the holding frame. This connection of the lifting frame permits it to slide with relation to the lever as the pipe is lifted and prevents binding. It also permits of longer leverage and more powerful action, and is such that the lifting frame may be readily reversed, whereby when the holding frame is reversed accordingly, a pipe may be forced down into a well, as shown in Fig. 3.

I claim:

The combination of lifting and holding frames, each comprising parallel side bars having connecting means adjacent their ends, and spacing members therebetween through which said connecting means pass, and each having intermediate opposing dogs, the spacing members of the lifting frame having rounded extensions projecting longitudinally beyond the ends of the frame, a supporting frame, and a lever fulcrumed upon said frame and having a yoke at one end provided with slots in its side pieces to slidably and rotatably receive the said extensions of said lifting frame, for the purpose described.

In testimony whereof I affix my signature in presence of two witnesses.

WADDILL L. RHODES.

Witnesses:
SHELAH W. ROBINSON,
ROBERT L. RHODES.